United States Patent
Winkler et al.

(10) Patent No.: US 7,636,635 B2
(45) Date of Patent: Dec. 22, 2009

(54) DEVICE FOR DETERMINING A FLIGHT TRAJECTORY OF A FOLLOWER AIRCRAFT DURING A PATROL FLIGHT, AS WELL AS A SYSTEM FOR AIDING A PATROL FLIGHT COMPRISING SUCH A DEVICE

(75) Inventors: Falk Winkler, Cintegabelle (FR);
Guillaume Fouet, Toulouse (FR);
Didier Menras, Toulouse (FR)

(73) Assignee: Airbus France, Toulouse (FR)

( * ) Notice: Subject to any disclaimer, the term of this patent is extended or adjusted under 35 U.S.C. 154(b) by 351 days.

(21) Appl. No.: 11/677,741

(22) Filed: Feb. 22, 2007

(65) Prior Publication Data
US 2008/0039986 A1 Feb. 14, 2008

(30) Foreign Application Priority Data
Feb. 28, 2006 (FR) .................................. 06 01713

(51) Int. Cl.
*G05D 1/02* (2006.01)
(52) U.S. Cl. .............................. 701/300; 701/3; 701/14; 340/435; 340/439; 244/158.1
(58) Field of Classification Search ...................... 701/3, 701/13, 14, 300; 340/435, 439; 244/158.1
See application file for complete search history.

(56) References Cited

U.S. PATENT DOCUMENTS

| 6,097,315 | A  | * | 8/2000 | Minter ....................... 340/961 |
| 6,477,449 | B1 | * | 11/2002 | Conner et al. .................. 701/4 |
| 6,718,236 | B1 |   | 4/2004 | Hammer et al. |
| 2005/0165516 | A1 |   | 7/2005 | Haissig et al. |
| 2006/0265109 | A1 |   | 11/2006 | Canu-Chiesa et al. |

FOREIGN PATENT DOCUMENTS

| EP | 1473546 | 11/2004 |
| FR | 2632755 | 12/1989 |

OTHER PUBLICATIONS

Preliminary Search Report dated Oct. 26, 2006 with English translation.

* cited by examiner

*Primary Examiner*—Gertrude Arthur Jeanglaud
(74) *Attorney, Agent, or Firm*—Dickinson Wright PLLC

(57) ABSTRACT

A device for determining a flight trajectory of a follower aircraft during a patrol flight, as well as a system for aiding a patrol flight including such a device. The device including another device to determine a flight trajectory of a follower aircraft which allows the follower aircraft to fly along one and the same flight trajectory as a lead aircraft, but with a posterior duration equal to a particular temporal offset.

9 Claims, 3 Drawing Sheets

DEVICE FOR DETERMINING A FLIGHT TRAJECTORY OF A FOLLOWER AIRCRAFT DURING A PATROL FLIGHT, AS WELL AS A SYSTEM FOR AIDING A PATROL FLIGHT COMPRISING SUCH A DEVICE

FIELD OF THE INVENTION

The present invention relates to a device for determining a flight trajectory of at least one follower aircraft, which allows said follower aircraft to follow a lead aircraft during a patrol flight, as well as to a system for aiding a patrol flight comprising at least one such device.

BACKGROUND OF THE INVENTION

It is known that a patrol of aircraft, for example of fighters or military transporters, is composed of a lead aircraft, also called the leader, which is followed in flight according to a particular spacing (defined vertically, longitudinally and laterally) by one or more follower aircraft, also called wingmen. The relative flight between the lead aircraft and a follower aircraft may be performed:
  either simply (and exclusively) on the basis of the judgment of the pilot of the follower aircraft, as a function of his direct vision of the lead aircraft;
  or by way of a system of information and/or for aiding piloting, such as an electronic system for aiding a patrol flight.

During a patrol flight, the aircraft follow one another while attempting, in particular, to constantly maintain one and the same longitudinal gap. This longitudinal gap which represents a distance-wise objective, may be expressed, when the flight is managed with the aid of an electronic system for aiding a patrol flight:
  either as a unit of distance (for example meters), calculated along the flight trajectory of the lead aircraft;
  or as a unit of time (for example seconds), corresponding to the division of the distance by the speed of the follower aircraft (or of the lead aircraft). In this case, the longitudinal gap also relates to a distance, but it is expressed indirectly through a unit of time.

Consequently, the longitudinal gap taken into account during a standard patrol flight always corresponds to a distance.

A standard patrol flight such as this thus exhibits several drawbacks. In particular:
  it requires a very fast reaction of the one or more follower aircraft, so as to constantly maintain the same distance with the lead aircraft. However, an aircraft and its systems inevitably exhibit inertia and a reaction time, this possibly giving rise to concertina effects and risks of instability, in particular in the case of long patrols comprising numerous follower aircraft;
  it implies that a variation in speed of the lead aircraft must necessarily be applied simultaneously to all the follower aircraft, this sometimes possibly being incompatible with the flight trim, in particular if not all the aircraft are in the same flight phase at the current instant.

SUMMARY OF THE INVENTION

The present invention relates to a device for determining a flight trajectory of at least one follower aircraft and which is intended to allow this follower aircraft to follow in flight a lead aircraft during a patrol flight. This device which is mounted on the follower aircraft is formed in such a way as to remedy the aforesaid drawbacks.

For this purpose, according to the invention, said device is noteworthy in that it comprises:
  first means for producing position information relating to said lead and follower aircraft and associated dating information;
  second means for determining, with the aid of said position and dating information, a first trajectory corresponding to the flight trajectory actually followed by said lead aircraft;
  third means for producing a temporal offset between said lead and follower aircraft; and
  fourth means for determining, with the aid of said first trajectory and of said temporal offset, a second trajectory which corresponds to said flight trajectory of the follower aircraft and which is formed in such a way as to allow said follower aircraft to fly along one and the same flight trajectory as the lead aircraft, but with a posterior duration equal to said temporal offset.

Thus, by virtue of said device in accordance with the invention which is entirely mounted on the follower aircraft, the latter follows the same flight trajectory as the lead aircraft (possibly with a lateral separation), doing so no longer at a predetermined (longitudinal) distance behind it (as is the case for the aforesaid standard patrol flights), but with a posterior duration which is equal to said temporal offset. Thus, except for a possible lateral separation, the flight profile of the follower aircraft is identical to that of the lead aircraft (leader). This avoids the need in particular for the follower aircraft to have to fly along a flight profile which is incompatible with its capabilities (acceleration, deceleration, etc).

Consequently, the device in accordance with the invention allows in particular the follower aircraft, on which it is mounted, to have a time of anticipation in the conduct of the flight, and also makes it possible to avoid concertina effects such as those mentioned above.

In a particular embodiment, said device comprises, moreover, guidance means intended to aid the guidance of the follower aircraft along said second trajectory. Of course, these guidance means may comprise means, such as a flight director for example, which are intended to give the pilot of the follower aircraft indications in such a way as to allow him to manually make the latter follow said second trajectory. However, in a preferred embodiment, said guidance means comprise automatic piloting means which automatically carry out (in standard fashion) the guidance of the follower aircraft along said second trajectory. In this case, the pilot can devote himself entirely (and in complete safety) to other tasks, such as the observation of his aerial environment or of the terrain overflown for example.

Furthermore, advantageously, said third means comprise a man/machine interface means allowing an operator, in particular the pilot of the follower aircraft, to input said temporal offset, for example twelve seconds, into said device.

In a first embodiment, said first means (carried onboard the follower aircraft) comprise:
  a first positioning element which measures the relative positioning between the lead aircraft and the follower aircraft in such a way as to produce said position information; and
  a first dating element which dates the measurements carried out by said first positioning element in such a way as to produce said dating information.

Furthermore, in a second embodiment, said first means (carried onboard the follower aircraft) comprise:
  a second positioning element which measures the effective (geographical) position of the follower aircraft; and a data reception element which is formed in such a way as to receive the effective (geographical) position of the lead aircraft, said effective (geographical) positions of said follower and lead aircraft forming said position information.

In this second embodiment:

in a first variant, said first means furthermore comprise a second dating element which dates the measurements carried out by said second positioning element in such a way as to produce dating information; and in a second variant, said data reception element mentioned above is formed in such a way as to also receive dating information.

The present invention also relates to a system for aiding a patrol flight, said patrol comprising a lead aircraft and at least one follower aircraft.

According to the invention, said system is noteworthy in that it comprises at least one device such as that mentioned above, which is mounted on said follower aircraft.

Furthermore, in a particular embodiment, said system moreover comprises:

a third positioning element which is mounted on the lead aircraft and which measures the effective position of said lead aircraft; and a data sending element which is mounted on the lead aircraft and which sends said effective position measured by said third positioning element so that it can be received by said data reception element mounted on the follower aircraft, said data sending element and said data reception element forming a data transmission system.

Furthermore, advantageously, the system can moreover comprise a third dating element which is mounted on the lead aircraft and which dates the measurements carried out by said third positioning element in such a way as to produce dating information, and said data sending element may be formed in such a way as to also send said dating information (which is then received by the aforesaid data reception element, which is mounted on the follower aircraft).

Of course, said system in accordance with the invention can be intended for a patrol flight, for a patrol comprising a lead aircraft and a plurality of follower aircraft. In this case, advantageously, each of said follower aircraft comprises a device such as that mentioned above.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTON

Figure 1:
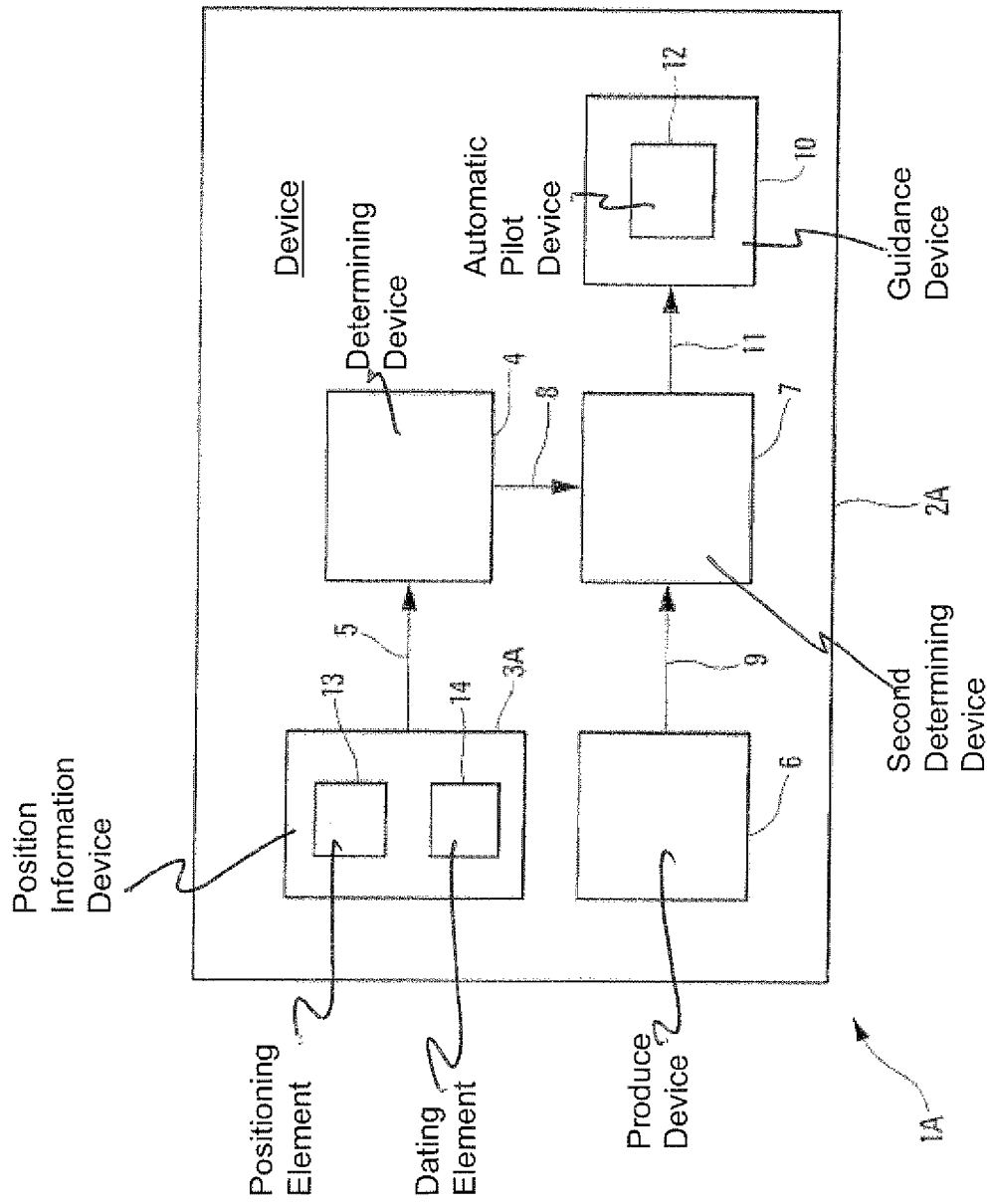
FIGS. 1 and 2 are the schematic diagrams of two different embodiments of a system for aiding a patrol flight, in accordance with the invention.
Figure 2:
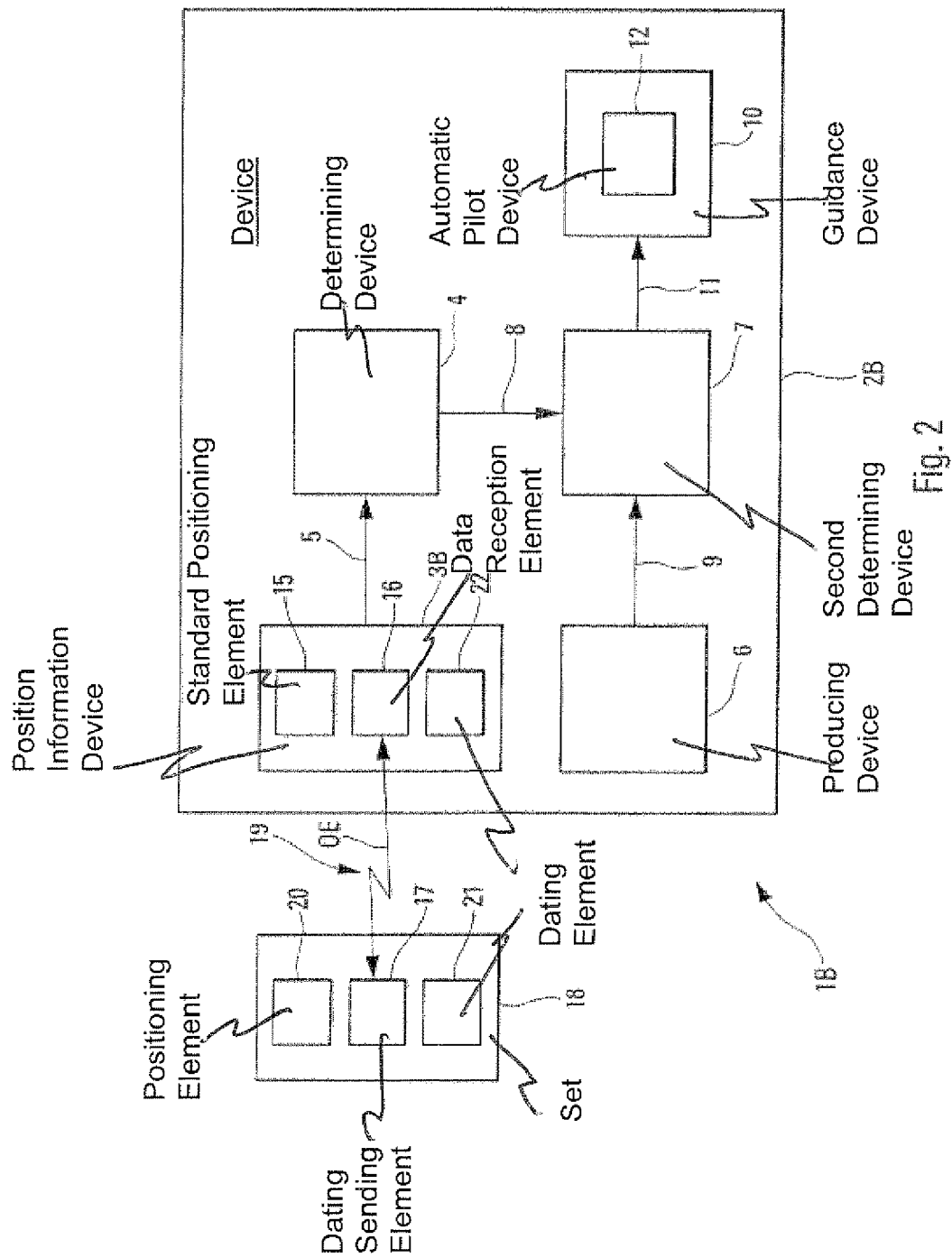
Figure 3:
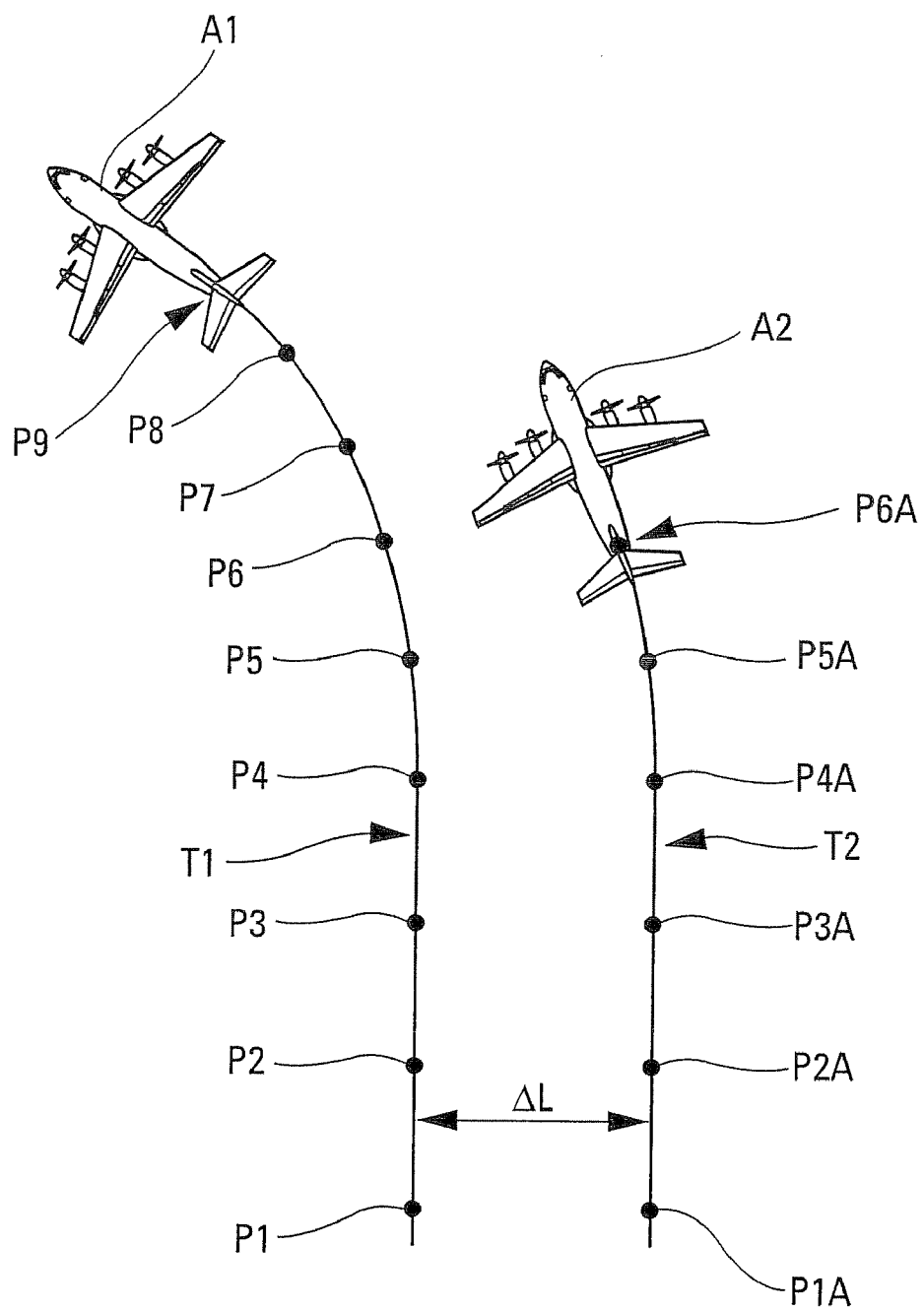
FIG. 3 diagrammatically illustrates an exemplary patrol flight implemented by virtue of a system for aiding a patrol flight, in accordance with the invention.

The system 1A, 1B in accordance with the invention and represented diagrammatically in FIGS. 1 and 2 is intended to embody an aid to a patrol flight. The patrol (or formation) taken into account comprises a lead aircraft (or leader) A1 and at least one follower aircraft (or wingman) A2 which follows in flight according to a particular spacing (defined vertically, longitudinally and laterally) said lead aircraft A1, as represented in FIG. 3.

According to the invention, said system 1A, 1B comprises at least one device 2A, 2B which is mounted on the follower aircraft A2.

Moreover, according to the invention, said device 2A, 2B comprises:

means 3A, 3B for producing position information which relates both to said lead aircraft A1 and to said follower aircraft A2, as well as associated dating information, as specified hereinbelow;

means 4 which are connected by way of a link 5 to said means 3A, 3B and which are formed in such a way as to determine, with the aid of said position and dating information received from said means 3A, 3B, a trajectory T1 corresponding to the flight trajectory actually followed by the lead aircraft A1;

means 6 for producing a temporal offset $\Delta t$ between the lead aircraft A1 and the follower aircraft A2; and means 7 which are connected respectively by way of links 8 and 9 to said means 4 and 6 and which are formed in such a way as to determine, with the aid of said trajectory T1 received from said means 4 and said temporal offset $\Delta t$ received from said means 6, a trajectory 22 which corresponds to the flight trajectory of the follower aircraft A2 and which is formed in such a way as to allow this follower aircraft A2 to fly along one and the same flight trajectory as the lead aircraft A1, but with a posterior duration equal to said temporal offset $\Delta t$, as specified hereinbelow.

Thus, by virtue of the device 2A, 2B in accordance with the invention which is entirely mounted on the follower aircraft A2, the latter follows the same flight trajectory as the lead aircraft A1 (possibly with a lateral separation $\Delta L$), doing so no longer at a (predetermined fixed) longitudinal distance behind it (as is the case for standard patrol flights), but with a posterior duration which is equal to said temporal offset $\Delta t$. Thus, except for a possible lateral separation $\Delta L$, the flight profile (trajectory T2) of the follower aircraft A2 is identical to that (trajectory T1) of the lead aircraft (leader) A1. This avoids the need in particular for the follower aircraft A2 to have to fly along a flight profile which is incompatible with its capabilities (acceleration, deceleration, etc).

By way of illustration, are represented various successive points P1 to P9 of the trajectory T1 in FIG. 3. Consequently, when the lead aircraft A1 overflies at a time ti a point Pi (i being an integer), the follower aircraft A2 overflies at a time ti+$\Delta t$:

either this point Pi (when T1 and T2 coincide);

or a point PiA which is offset laterally with respect to the point Pi, but lies at the same longitudinal level (when T2 is offset laterally with respect to T1, as represented in the example of FIG. 3).

As may be seen in FIG. 3, moreover, the distance between two successive points Pi and Pi+1 of T1 is not constant. It varies of course as a function of the speed of the aircraft A1. By virtue of the invention, the aircraft A1 and A2 are therefore separated longitudinally, not by a (constant) distance, but by a duration (corresponding to the temporal offset $\Delta t$).

Consequently, the device 2A, 2B in accordance with the invention allows in particular the follower aircraft A2, on which it is mounted, to have a time of anticipation in the conduct of the flight, and also makes it possible to avoid concertina effects with respect to the lead aircraft A1.

In a particular embodiment, said device 2A, 2B comprises moreover guidance means 10 which are connected by way of a link 11 to said means 7 and which are intended to aid the guidance of the follower aircraft A2 along said trajectory T2 determined by said means 7. These guidance means 10 may comprise means (not represented) such as a flight director for example, which are intended to give the pilot of the follower aircraft A2 indications in such a way as to allow him to manually make the latter follow said trajectory T2. However, in a preferred embodiment, said guidance means 10 comprise automatic piloting means 12, which automatically carry out (in standard fashion) the guidance of the follower aircraft A2 along said trajectory T2. In this case, the pilot of said follower aircraft A2 can devote himself entirely (and in complete safety) to other tasks, such as the observation of his aerial environment or of the terrain overflown in particular.

In a particular embodiment, said means 6 consist of a man/machine interface means allowing an operator, especially the pilot of the follower aircraft A2, to input into said device 2A, 2B said temporal offset Δt, for example twelve seconds.

Additionally, in a first embodiment represented in FIG. 1, said means 3A comprise:
  a positioning element 13 which measures the relative positioning between the lead aircraft A1 and the follower aircraft A2 in such a way as to produce said position information. For this purpose, this positioning element 13 may, for example, measure the azimuth and the distance with respect to the lead aircraft A1; and
  a dating element 14 which dates the measurements carried out by said positioning element 13 in such a way as to produce said dating information.

Furthermore, in a second embodiment represented in FIG. 2, said means 3B of said device 2B (which is carried onboard the follower aircraft A2 as indicated hereinabove) comprise:
  a standard positioning element 15, for example a GPS receiver, which measures the effective absolute position of the follower aircraft A2; and
  a data reception element 16 which is formed in such a way as to receive the effective absolute position of the lead aircraft A1, said effective absolute positions of said follower aircraft A2 and of said lead aircraft A1 forming said position information.

This data reception element 16 cooperates with a data sending element 17 which forms part of a set 18 mounted on the lead aircraft A1. Said data sending element 17 and said data reception element 16 form a data transmission system 19, of standard type, transmitting for example data in the form of electromagnetic waves OE. Said set 18 comprises, moreover, a positioning element 20, for example similar to the positioning element 15, which is formed in such a way as to measure the effective absolute position of said lead aircraft A1.

The effective absolute position, measured by said positioning element 20 and transmitted by the element 17 to the element 16, may be dated:
  in a first variant embodiment, by way of a dating element 21 which forms part of said set 18; and
  in a second variant embodiment, by way of a dating element 22 which forms part of said means 3B.

A dating element 21, 22 may be a standard clock of a GPS receiver.

Additionally, in a particular embodiment, said data transmission system 19 may also transmit to said follower aircraft A2 flight parameters of the lead aircraft A1, such as its position, its speed or its rate of turn for example. These flight parameters may in particular be used by the means 4 to refine the flight profile of the lead aircraft A1.

Of course, said system 1A, 1B in accordance with the invention may be intended for a patrol flight, for a patrol comprising a lead aircraft A1 and a plurality of follower aircraft A2. In this case, each of said follower aircraft A2 is equipped with a device 2A, 2B such as that mentioned above.

The invention claimed is:

1. A device for determining a flight trajectory of at least one follower aircraft, which allows said follower aircraft to follow a lead aircraft during a patrol flight, said device being mounted on said follower aircraft and comprising:
  a position information device for producing position information relating to said lead and follower aircraft, said position information device comprising at least one positioning element which measures the effective position of the follower aircraft;
  a determining device to determine, with the aid of information received from said position information device, a first trajectory corresponding to the flight trajectory actually followed by said lead aircraft;
  a producing device to produce a temporal offset between said lead and follower aircraft; and
  a second determining device to determine, with the aid of said first trajectory and of said temporal offset, a second trajectory which corresponds to said flight trajectory of the follower aircraft, wherein:
  said position information device furthermore comprises a data reception element which is formed in such a way as to receive the effective position of the lead aircraft, said effective positions of said follower and lead aircraft forming said position information, and a dating element which dates the measurements carried out by said positioning element in such a way as to produce dating information;
  said determining device determines said first trajectory with the aid of said position information and of said dating information;
  said data reception element is also formed in such a way as to receive flight parameters from the lead aircraft; and
  said second determining device using the flight parameters to refine said second trajectory which allows said follower aircraft to fly along one and the same flight profile possibly with a lateral separation as the lead aircraft, but with a posterior duration equal to said temporal offset.

2. The device as claimed in claim 1, which further comprises a guidance device intended to aid the guidance of the follower aircraft along said second trajectory.

3. The device as claimed in claim 1, wherein said producing device comprises a man/machine interface device allowing an operator to input said temporal offset into said device.

4. The device as claimed in claim 1, wherein said data reception element is formed in such a way as to also receive dating information.

5. A system for aiding a patrol flight, said patrol comprising a lead aircraft and at least one follower aircraft, which comprises at least one device such as that specified under claim 1, which is mounted on said follower aircraft.

6. The system as claimed in claim 5, which further comprises a positioning element which is mounted on the lead aircraft and which measures the effective position of said lead aircraft; and a data sending element which is mounted on the lead aircraft and which sends said effective position measured by said positioning element so that it can be received by said data reception element mounted on the follower aircraft, said data sending element and said data reception element forming a data transmission system.

7. The system as claimed in claim 6, which further comprises a dating element which is mounted on the lead aircraft and which dates the measurements carried out by said positioning element in such a way as to produce dating information, and wherein said data sending element is formed in such a way as to also send said dating information.

8. The system as claimed in claim 5, for an aid to a patrol flight comprising a lead aircraft and a plurality of follower aircraft, which comprises a plurality of devices such as that specified under claim 1, each of said follower aircraft being equipped with such a device.

9. An aircraft, which comprises at least one device such as that specified under claim 1.

* * * * *